M. LEVY.
SPRING WHEEL.
APPLICATION FILED OCT. 21, 1918.
1,339,361.
Patented May 4, 1920.
2 SHEETS—SHEET 1.
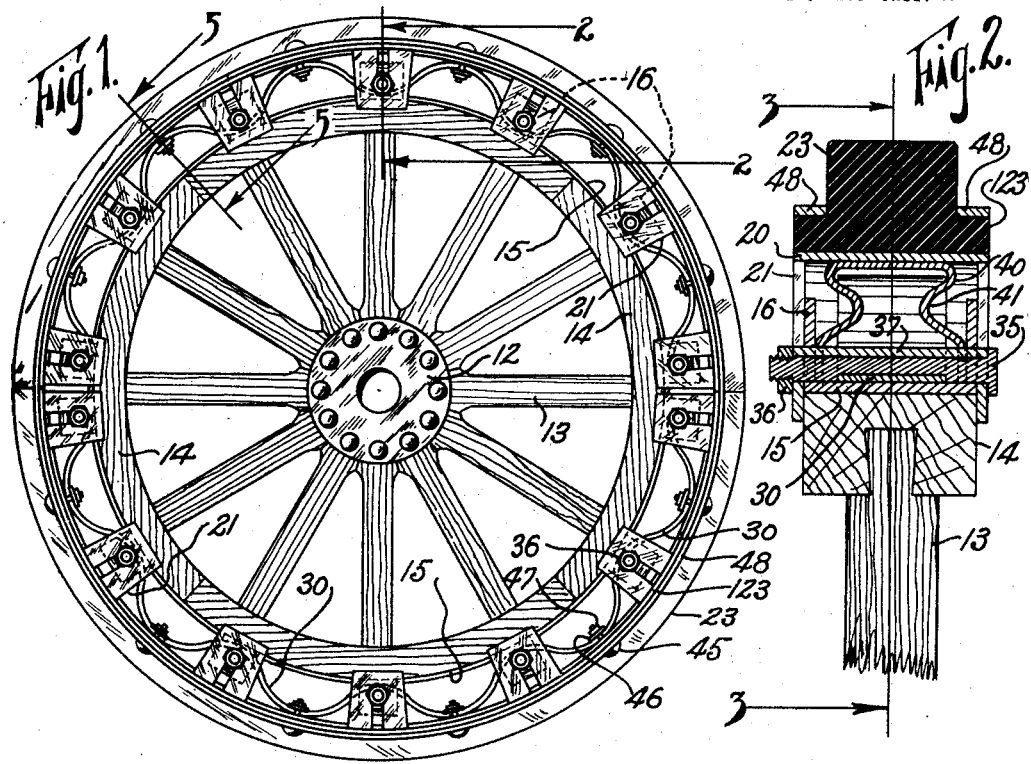
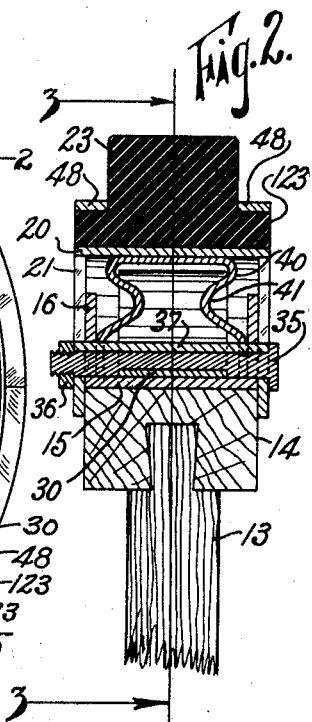
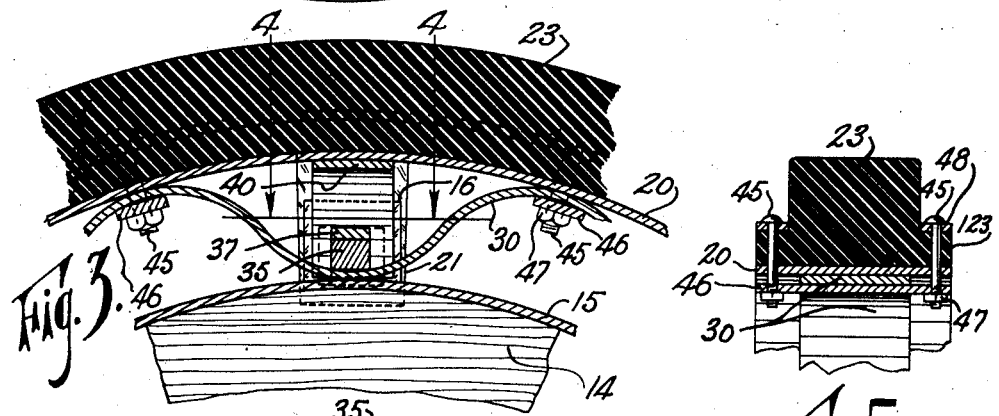
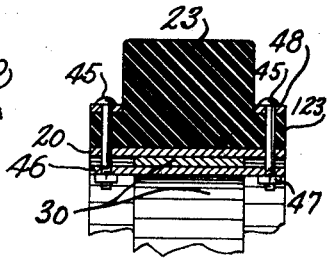
Inventor
M. LEVY M. LEVY.
SPRING WHEEL.
APPLICATION FILED OCT. 21, 1918.
1,339,361.
Patented May 4, 1920.
2 SHEETS—SHEET 2.
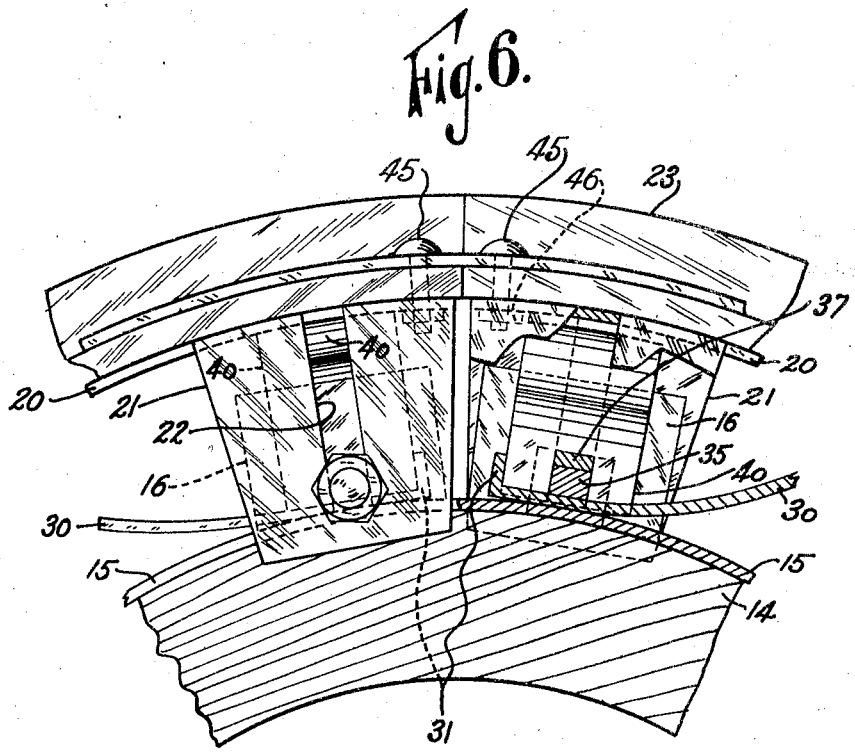
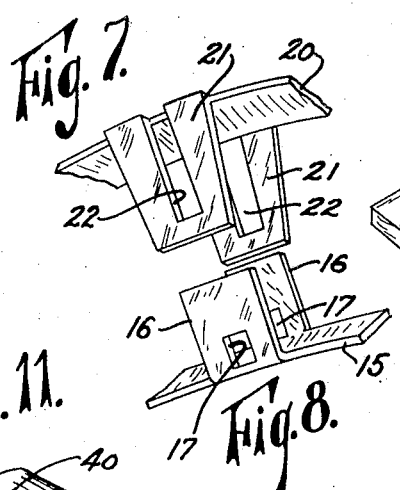
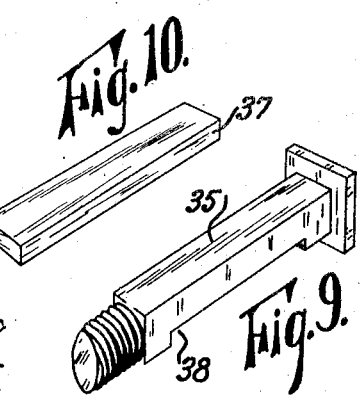
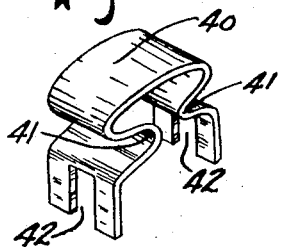
Inventor
M. LEVY

UNITED STATES PATENT OFFICE.

MORRIS LEVY, OF DENVER, COLORADO.

SPRING-WHEEL.

1,339,361.  Specification of Letters Patent.  Patented May 4, 1920.

Application filed October 21, 1918. Serial No. 259,016.

*To all whom it may concern:*

Be it known that I, MORRIS LEVY, a citizen of the United States, residing at 2657 Welton street, in the city and county of Denver and State of Colorado, have invented certain new and useful Improvements in Spring-Wheels; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of the invention is to furnish a resilient wheel which will have the advantages of a pneumatic-tired wheel without the employment of pneumatic parts.

Briefly, the invention comprises a felly and a tire connected for slight relative movement toward and from each other, and between which there is interposed an undulating or corrugated leaf spring, reinforced at certain points, if necessary, by smaller springs, and adapted to yield under load stress. In the drawings:

Figure 1 is a side elevation of a wheel embodying the invention.

Fig. 2 is a cross section on the line 2—2 of Fig. 1.

Fig. 3 is a fragmentary longitudinal section on the line 3—3 of Fig. 2.

Fig. 4 is a longitudinal horizontal sectional detail, indicated by line 4—4 of Fig. 3.

Fig. 5 is a section on the line 5—5 of Fig. 1.

Fig. 6 is a detail in elevation showing the method of anchoring the ends of the leaf spring, parts being broken away for clearness.

Fig. 7 shows the positioning lugs on the rim by means of which the parts are retained in proper relation; and Fig. 8 shows the coöperating lugs on the felly band.

Fig. 9 shows one of the bolts to connect the lugs of Figs. 7 and 8, and to aid in retaining the ends of the springs.

Fig. 10 shows a spacing and filling pin which coöperates with the bolt.

Fig. 11 is a perspective of one of the auxiliary or reinforcing springs.

The wheel has the usual hub, 12, spokes, 13, and felly, 14. A felly band, 15, surrounds the felly and is provided at intervals with outwardly projecting lugs, 16, provided with slightly elongated apertures, 17. Spaced from the band 15 is a rim, 20, composed of two semi-circular parts and provided with inwardly extending lugs, 21, to coöperate with the lugs 16 and fit on the outer sides thereof, the lugs 21 being provided with slots, 22. Mounted upon the rim, 20, is a solid rubber tire, 23, also formed in two semi-circular parts.

Interposed between the felly band, 15, and the rim, 20, are two corrugated or undulating leaf springs, 30, each being coextensive with the semi-circular parts of the rim, 20, and the undulating portions alternately engaging the rim and the felly band. The ends of the springs are turned up at 31 (Fig. 6) to retain the ends of the springs, as described hereinafter.

When the lugs 16 and 21 are arranged in coöperative position, a square-headed bolt, 35, is passed through the apertures 17 and slots 22, the bolt being lifted up to pass over the adjacent portion of the spring 30, and then dropped down so that the spring will seat in the recess, 38, in the bolt. The spacing and filling pin, 37, is then passed through the apertures, 17, resting on the bolt, 35, and completely filling said apertures. The ends of this pin, 37, extend into the slots, 22, one end engaging the head of the bolt and the other end the nut, 36, which is screwed up tight against the pin. This avoids drawing the lugs 16 and 21 together and permits the bolt 35 to slide freely in the slots 22.

It is found advantageous to use auxiliary springs, 40, at the points where the spring 30 engages the felly band, which are also where the lugs 16 and 21 are located. These springs 40 are approximately U-shaped, but have their sides bowed inwardly, as shown at 41, to provide the proper spring structure. They are positioned between the rim, 20, and the leaf spring, 30. Their extremities are slotted at 42, in order that they may engage about the bolts 35 and filling pins 37. The ends of the springs 30 are held by engagement of the upturned ends, 31, thereof with the adjacent edges of the adjacent springs, 40.

Bolts, 45, extend on opposite sides of the portions of spring 30, which engage the rim 20 and carry spring positioning plates, 46, which are retained by means of nuts, 47, on the bolts. These bolts pass through the rim 20 and also through the tire-retaining bands, 48, and the lateral portions, 123, of the tire, 23, to retain the bands, 48, and the tire also in position. While the bolts fit snugly in the rim, they are not fixed therein but are adapted to have slight movement longitudinally of their axes as the tire is compressed, so that the plates 46 when in their lowermost positions, will always release adjacent portions of spring 30 sufficiently for movement lengthwise thereof. This structure permits that portion of the spring bearing the load stress to have free movement along its length when compressed. The reason for this provision is that when the wheel revolves under load, the tendency will be to flatten the lower portion of the spring, 30, which will shift somewhat in the direction of its length beneath the plates, 46, and in the recesses 38 on the under sides of bolts 35 which loosely receive the spring. At the same time the curvature at the side portions of spring 30 will increase accordingly. Also, each spring, 40, as it approaches the lowermost position, will yield.

Having thus described my invention, what I claim is:

1. In a spring wheel, the combination with a hub and a felly, of a rim spaced therefrom, resilient means interposed between the felly and the rim, comprising an elongated undulated leaf spring, engaging points on the rim and on the felly alternately, and means connected with the felly and loosely engaging the outer face of the spring at each point where it engages the felly to retain the spring in position and permit movement in the direction of its length, the undulations of the spring being on long curves whereby said longitudinal movement of the spring may take place.

2. In a spring wheel, the combination with a hub and a felly, of a rim spaced therefrom, resilient means interposed between the felly and the rim, comprising an elongated undulated leaf spring, engaging points on the rim and on the felly alternately, means connected with the felly and engaging the outer face of the spring at each point where it engages the felly to retain the spring in position, and similar means connected with the rim and loosely engaging the inner side of the spring at each point where it engages the rim to retain the spring in position and permit sliding movement in the direction of its length, the undulations of the spring being on long curves whereby said longitudinal movement of the spring may take place.

3. In a spring wheel, the combination with a hub and a felly, of a rim spaced therefrom, resilient means interposed between the felly and the rim, comprising an elongated undulating leaf spring engaging points on the rim and on the felly alternately and an auxiliary approximately U-shaped spring reinforcing said leaf spring at each point where said leaf spring engages the felly.

4. In a spring wheel, the combination with a hub and a felly, of a rim spaced therefrom, resilient means interposed between the felly and the rim, comprising an elongated undulating leaf spring engaging points on the rim and on the felly alternately, an auxiliary approximately U-shaped spring reinforcing said leaf spring at each point where said leaf spring engages the felly, and coöperating members projecting from the felly and from the rim and slidably connected with each other.

5. In a spring wheel, the combination with a hub and a felly, of a rim spaced therefrom, resilient means interposed between the felly and the rim, and coöperating members extending from the felly and rim and slidably connected with each other, said members having apertures therein and the apertures in certain members being elongated, headed bolts extending through said apertures, nuts on said bolts, and spacing bars also extending through said apertures and held between the heads and the nuts on the bolts.

6. In a spring wheel, the combination with a hub and a felly, of a rim spaced therefrom, resilient means interposed between the felly and the rim, comprising an elongated undulated leaf spring, engaging points on the rim and on the felly alternately, means connected with the felly and engaging the outer face of the spring at each point where it engages the felly to retain the spring in position, and an approximately U-shaped spring reinforcing the leaf spring at each point where it engages the felly.

7. In a spring wheel, the combination with a hub and a felly, of a rim spaced therefrom, resilient means interposed between the felly and the rim, comprising an elongated undulated leaf spring engaging points on the rim and on the felly alternately, means connected with the felly and engaging the outer face of the spring at each point where it engages the felly to retain the spring in position, and an approximately U-shaped spring reinforcing the leaf spring at each point where it engages the felly, the extremities of the U-shaped spring being bifurcated to straddle said retaining means.

8. In a spring wheel, the combination with a hub and a felly, of a rim spaced therefrom, resilient means interposed between the felly and the rim, comprising an elongated undulated leaf spring, engaging points on the rim and on the felly alternately, means connected with the felly and engaging the outer face of the spring at each point where it engages the felly to retain the spring in position, an approximately U-shaped spring reinforcing the leaf spring at each point where it engages the felly, and similar means connected with the rim and loosely engaging the inner side of the spring at each point where it engages the rim to retain the spring in position and permit movement in the direction of its length.

9. In a spring wheel, a rim, a felly within the rim, an undulating spring positioned therebetween, means to engage the spring and retain it in position on the rim, said means comprising bars extending transversely of the wheel, a resilient tire mounted on the rim and having lateral extensions, bands engaging the outer faces of said extensions, and bolts extending through said bands, extensions, rim and bars to retain the parts in operative relation.

In testimony whereof I affix my signature.

MORRIS LEVY.